Nov. 3, 1953     D. F. MURPHY     2,658,120
PRESSURE RESPONSIVE SWITCH
Filed May 25, 1948     3 Sheets-Sheet 1

INVENTOR.
Donald F. Murphy.
BY
George V. Eltgroth.
Attorney

Nov. 3, 1953     D. F. MURPHY     2,658,120

PRESSURE RESPONSIVE SWITCH

Filed May 25, 1948     3 Sheets-Sheet 2

INVENTOR.
Donald F. Murphy.
BY George V. Eltgroth
Attorney

Nov. 3, 1953  D. F. MURPHY  2,658,120
PRESSURE RESPONSIVE SWITCH
Filed May 25, 1948  3 Sheets-Sheet 3
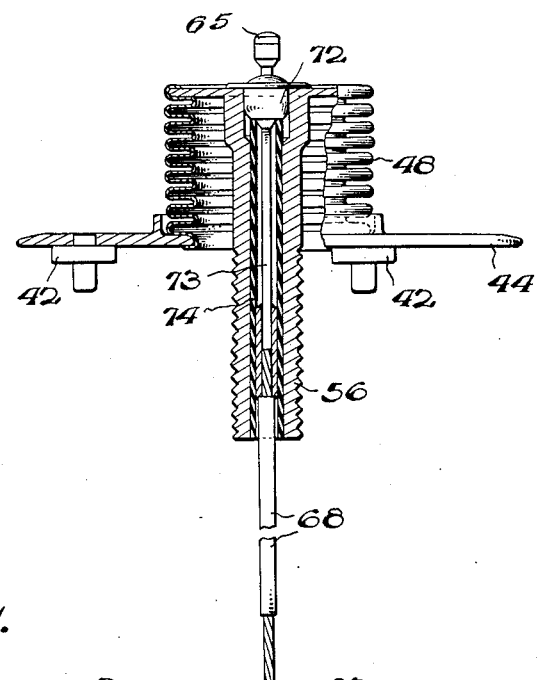
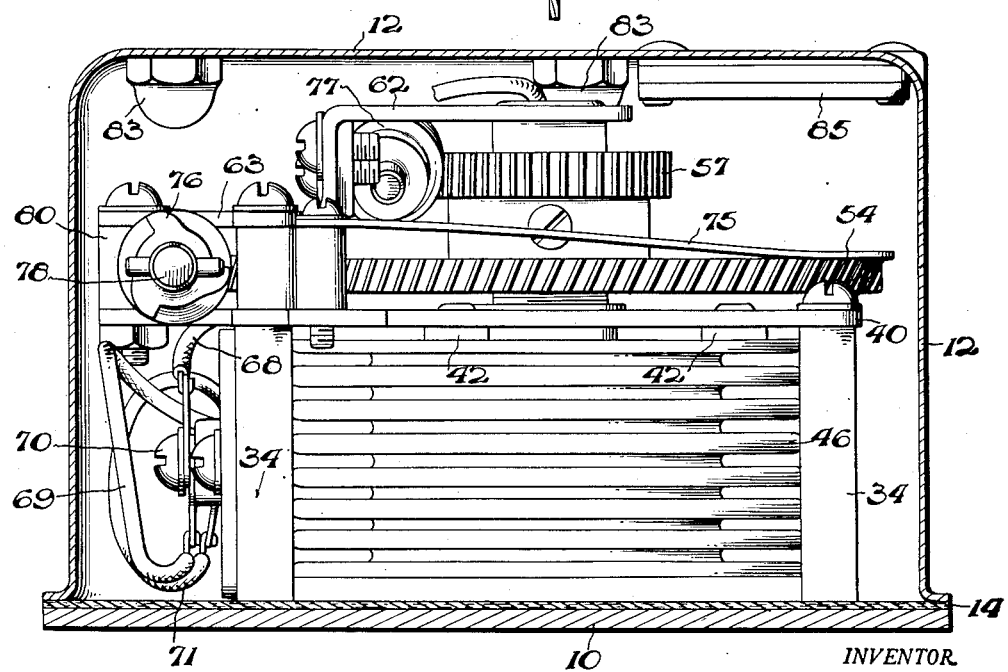
INVENTOR.
Donald F. Murphy.
BY
George V. Eltgroth
Attorney Patented Nov. 3, 1953

2,658,120

UNITED STATES PATENT OFFICE 2,658,120

PRESSURE RESPONSIVE SWITCH

Donald F. Murphy, Baltimore, Md., assignor to Bendix Aviation Corporation, Baltimore, Md., a corporation of Delaware Application May 25, 1948, Serial No. 29,129

14 Claims. (Cl. 200—83)

This invention relates to pressure responsive switches and more particularly to an adjustable switch having contacts situated within a hermetically sealed chamber.

The problems of air-cargo delivery, military operations and personnel protection, have stimulated the development of devices automatically releasing parachutes at conveniently presettable altitudes. The release has been effected either by mechanically powered systems having a pressure actuated trip, or an electrically controlled release combination serving either to trip a mechanical latch in response to the action of an electric solenoid, or to fire the powder charge in an explosion motor. The apparatus described herein is a switch especially suitable for use in conjunction with electrically controlled parachute releases but may, of course, be advantageously employed in many other applications where the requirements of reliability are unusually stringent.

The problem of personnel protection first focused interest on the development of a reliable switch, cooperating with a suitable release mechanism, which would effect that release at a desired pressure altitude, so that unconscious and otherwise disabled aircraft personnel might be unloaded from aircraft with the knowledge that their parachute would open at the altitude selected and bring the wearer safely to earth. It is clearly apparent that with the factor of human life involved the switch reliability must be enhanced to such a degree that a failure of this part is so unlikely as to border on the impossible, else the confidence of those having need of such equipment would be undermined to such an extent that in many cases they would not employ this valuable safeguard but rather prefer to accept the hazards to which they are presently exposed.

Early work in this field soon developed the presence of material deviations between the pressure altitude and the actual opening altitude arising out of the suction and ram effects observed at the rearmost and forward part of a falling body, respectively. The positioning of the pressure responsive switch was therefore a critical factor unless its location and the point at which control pressures were derived could be conveniently separated. In this manner, it would be possible to place the inlet to the pressure conduit at a point experiencing a minimum of pressure variation with changes in attitude arising from the suction and ram effects while at the same time locating the switch at its optimum design point in the 'chute pack or cargo assembly. It was found that the desired operating characteristics could only be attained with a sealed switch housing connected by a pressure conduit with the proper point on the surface of the falling body.

Field experience further indicated that switch failures were frequently caused by the presence of dust particles on one or the other of the contacts, preventing their engagement or necessitating the development of such force to overcome the mechanical separation which they produce that the pressure altitude calibration could not be relied upon. While these conditions could be overcome by the use of a hermetically sealed switch driven by a separate pressure capsule, the multiplication of parts and complexity of switch design operated as limiting factors restricting the scope of application of this remedy.

Accordingly it is an object of this invention to provide a new and novel pressure sensitive switch characterized by an almost absolute reliability of operation.

Another object of the invention is to provide a new and novel barometric pressure responsive switch responding only to pressure changes arising over a selected path.

Still another object of the invention is to provide a new and novel barometrically controlled switch in which the values of altitude and ground barometric pressure may be conveniently and independently set into the mechanism.

Yet another object of the invention is to provide a new and novel pressure capsule actuated switch in which the switch contacts are situated within the capsule proper.

Other objects and advantages of the invention will in part be obvious and in part be described when the following specification is read in conjunction with the drawings in which Figure 1 is a plan view, with the cover in section, of a pressure responsive switch embodying the principles of the invention Figure 2 is an end view of the improved pressure switch with the cover again in section Figure 3 is a sectional view of the improved pressure switch taken along the line 3—3 in Figure 1

Figure 4 is a side view of the pressure switch partly in section and

Figure 5 is a sectional view illustrating the connection of the contact and adjusting member to the inner adjustable bellows.

Figure 1:
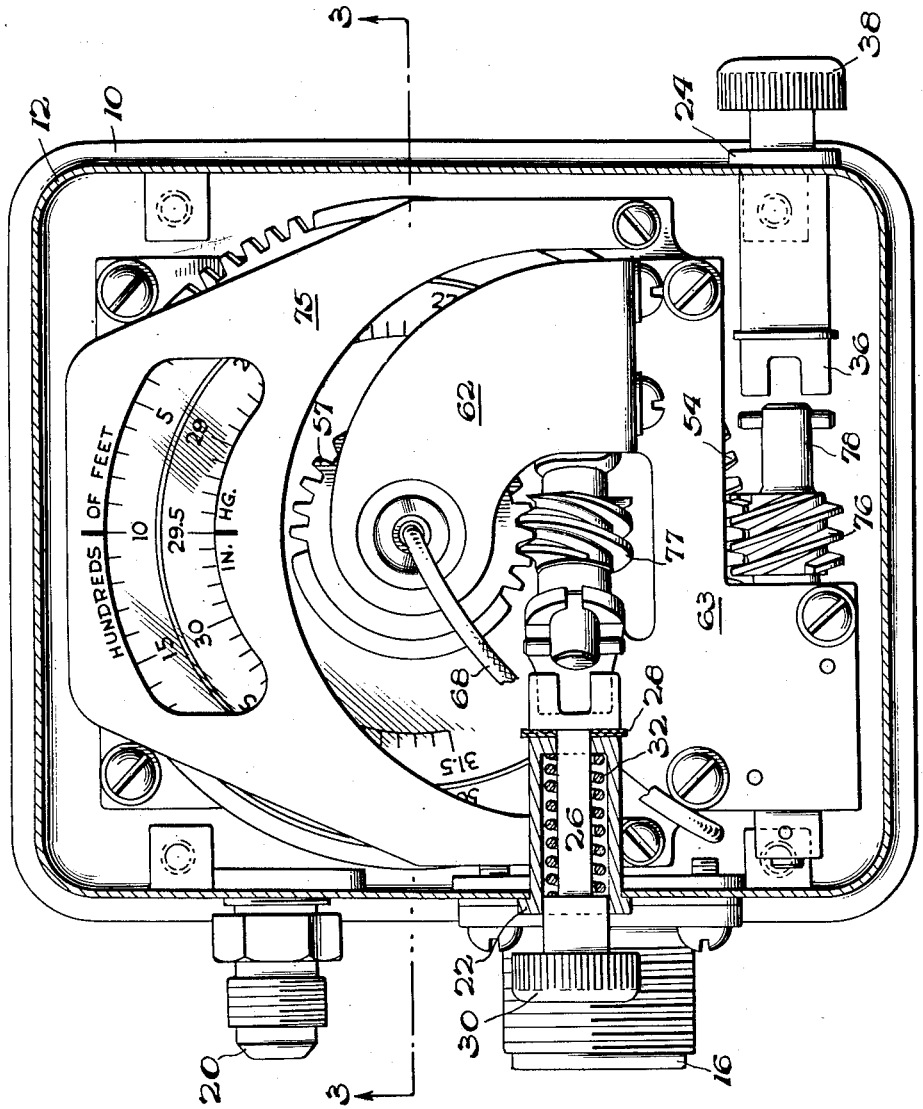
Figure 2:
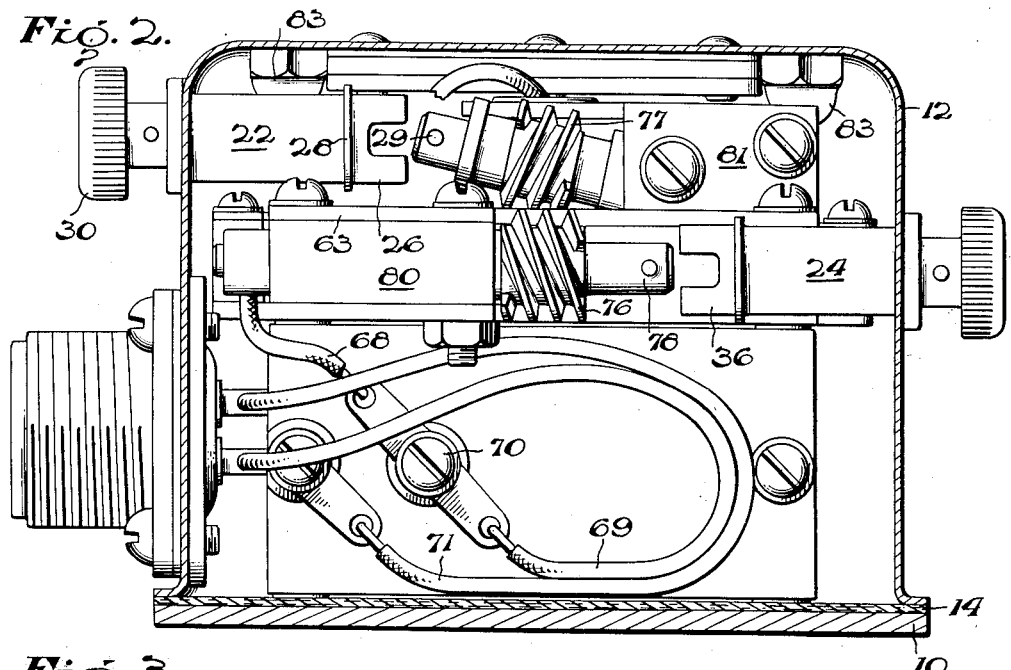

Referring now to the drawings, it is seen that the switch is assembled on a base 10 to which there is secured a cover 12, a sealing gasket 14 being interposed between the mating surfaces of the cover 12 and the base 10. A number of lugs 18 are secured to the inside of the bottom periphery of the case cover 12. A number of screws passing through the base engage threaded apertures in these lugs and maintain the cover in secure engagement with the base 12 and gasket 14. In addition, a pressure-tight electric connector 16, a pressure fitting 20, a pressure bushing 22 and an altitude bushing 24 are carried by the cover anchored to the case by air-tight joints. Each of these bushings houses an axially displaceable rotatable adjusting member with slotted ends engaging corresponding pins on a rotatable worm drive when pressed inward for the purpose of setting the operating pressure. The pressure drive assembly is shown in detail and includes a drive shaft 26, with an enlarged slotted end, within the bushing 22. The bushing 22 is provided with a large bore over a great part of its length, and a relatively small bore over the remainder of its length, the adjusting shaft 26 fitting snugly within this reduced bore with a resilient washer 28 between the enlarged end of the driving shaft 26 and the adjacent end of the bushing 22. A coil spring 32 seats on the inner shoulder formed by the bore reduction within the bushing 22 and at its other end engages the setting knob 30. Normally, the spring 32 forces the setting knob 30 outwardly to seat the slotted end of the driving member 26 firmly against the resilient washer 28 and provide a pressure-tight seal at this point. These switches are usually set before use rather than during the fall, so that destruction of the seal by pressing the setting knob 30 inwardly during the setting operation is in no way objectionable. The internal structure associated with the altitude bushing 24 is substantially identical and therefore will not be discussed at length.

Figure 3:
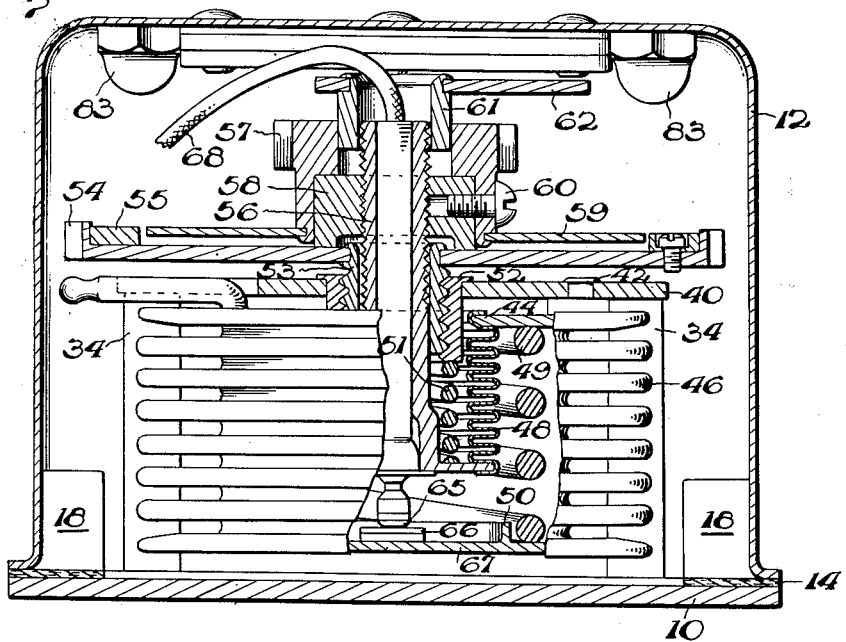

Four threaded studs 34 are hermetically secured to the base 10 and a main plate 40 is anchored thereto. The bellows plate 44 is anchored to the main plate 40 by rolling over the extended ends of the studs 42 sweated to the bellows plate. An outer bellows 46 may be sweated to the outer periphery of the bellows plate 44 and supported internally by the spring 49 resting just outside the locating ridge 50. The bellows plate 44 is further provided with an aperture to whose inner periphery there is secured the inner bellows 48 partially supported by a bellows spring 51 abutting the inner end of a threaded bushing 52 secured to the main plate 40. These features may be most easily visualized from an inspection of Figures 3 and 5.

A hub 53 is assembled to the altitude gear 54 carrying an annular altitude scale plate 55 whereby, upon rotation of the altitude gear 54, this member is advanced and retracted with respect to the main plate 40 and the bellows plate 44. In addition, a threaded contact coupling 56 passes freely through the hub 53 and bushing 52 to the end of the bellows 48 to which it is hermetically anchored, as by sweating, etc. This contact coupling has secured thereto at its inner end a contact, in a manner which will be later treated in connection with the discussion of Figure 5. The threaded periphery of the contact carrier 56 engages the correspondingly threaded adjusting nut 58 which is locked to the pressure drive gear 57 by a screw 60. The depending extension of the pressure gear 57 is rolled over to lock the pressure correction scale 59 in place. The nut 58 is cut away around its central aperture to clear the hub 53 of the altitude gear 54 and is maintained in engagement with this surface by the action of the inner bellows spring 51. Hence, rotation of the barometric gear 57 moves the contact coupling 56 axially with respect to the upper surface of the altitude gear 54 and thereby permits superposing a barometric correction upon the altitude setting.

The hollow stub shaft 61 is mounted on the auxiliary bracket 62 extending from the bracket plate 63 in alignment with the common centers of rotation of the altitude gear 54 and barometric gear 57. The inner diameter of the stub shaft 61 is proportioned to freely receive the contact coupling 56, while its outer periphery provides a bearing surface for the barometric gear 57. A contact 65, insulatingly secured to the inner end of the contact carrier 56, cooperates with a contact surfaces 66 on the end plate 67 of the external bellows 46 to open and close an electric circuit therethrough in response to pressure induced movement of the bellows 46. The chamber defined by the inner bellows 48 and outer bellows 46 may be evacuated, or may be filled to any desired pressure for obtaining the required pressure deflection characteristic for the end plate 67 of the outer bellows. An insulated lead 68 is brought out through the hollow interior of the contact coupling 56 and is secured at the insulated screw and bushing 70 to the lead 69 connecting with the electric receptacle 16. The contact surface 66 is conductively associated with the end plate 67 of the metallic bellows 46 and hence the connection of the lead 71 between the frame of the instrument and the electric receptable 16 serves to complete the necessary access to the contacts within the evacuated bellows chamber.

An inspection of Figure 5 at this point will clarify the nature of the inner bellows and contact assembly. This view clearly shows the assembly of the inner bellows 48 to the bellows plate 44 and the sweated connection of the contact connection 56 with its inner end. The contact 65 is secured to the glass insulated central conductor within an insulating eyelet 72 and electrically connected to the metallic tube 73 surrounded by an insulating sleeve 74. The lead 68 is stripped, tinned and soldered within the open end of the conductive tube 73 to afford electric connection to the contact 65.

The earlier description of the operation of the altitude gear 54 and barometric gear 57 has brought out their relative movement with respect to the main plate 40. If parallax error is to be avoided, the cooperating index-carrying scale member must rise and fall with these gears and their associated scales, both of which lie in the same plane and move together. This is accomplished by the use of an extended resilient index plate 75 initially formed so that when anchored to the auxiliary bracket 63 it positively engages the scale-bearing members 55 and 59. Its inherent resilience permits it to follow the axial movement of these scale-bearing elements.

The altitude gear 54 and barometric gear 57 are driven by the altitude worm 76 and barometric worm 77, respectively. The altitude worm 76 is journaled in the bearing block 80 on the under side of the auxiliary bracket 63, while the barometric worm 77 is journaled at an angle corresponding to its pitch angle in a bearing block 81 secured above the auxiliary bracket 63. The inclination of the barometric worm 77 is necessitated by the consideration that the teeth on the periphery of the barometric gear 57 must lie parallel to the axial movement produced by the rotation of the altitude gear 54 to avoid any reaction between the barometric and altitude settings.

With these structural features in mind, the mode of employment and application of the switch may be readily comprehended. The instrument is mounted either by screws threaded into the base 10 or by screws engaging the cap nuts 83 hermetically engaging the under side of the cover 12. A pressure line is then attached to the pressure fitting 20 and run to the desired pressure pick-up point on the exterior of the body carrying the parachute. Connections to the operating circuit are made through the electric fitting 16. It will be noted that at high altitudes the outer bellows 46 is extended to disengage the contact surface 66 from the insulated inner contact 65 and under these conditions the switch presents an open circuit. A decrease in altitude produces a rise in the ambient atmospheric pressure compressing the outer bellows 46 until the contact surface 66 engages the contact 65, completing the electric circuit between the terminals in the electric receptacle 16. The disabling switch required to prevent undesired operation of the parachute release when the aircraft is on the ground is not included within the structure of this switch but is assumed to be inserted at some other point in the circuit.

When it is desired to launch a body provided with an electrically responsive parachute release governed by the operation of the switch described here, the barometric scale 59 is set to the ground pressure by pressing the setting knob 30 inwardly until the slots in the driving link 26 engage the pin connector 79 and rotating same until the proper reading is observed on the barometric dial 59. Thereafter, the altitude setting is made by depressing the setting knob 38 to engage the pin drive 78 and slotted shaft 36, after which the setting knob 38 is rotated as required to obtain the desired reading on the altitude scale 55. As has been earlier developed, the inward motion of the setting knob breaks the seal of the setting shafts against their associated resilient washers but this is unimportant, as the seal is only required after the launching of the parachute protected cargo and, since no settings are being made during the fall, the required seal exists when needed. The inclined angle of mounting for the barometric worm 77 does not interfere with adjustment since the pin and slot drive serves as a universal joint.

The setting of the altitude dial 55 rotates the altitude gear 54 to move it toward and away from the main plate 40, thereby controlling the separation of the contacts 65 and 66, while the rotation of the barometric gear 57 and barometric scale 59 further advances or retracts the contact 65 to superpose the desired pressure correction on the altitude setting.

The object is then launched and as it falls the atmospheric pressure increases, compressing the outer bellows 46 until the contact surface is engaged to complete an electric circuit which may be connected with an electrically governed parachute release such as that described in copending U. S. application Serial No. 566,362, filed December 2, 1944, by William L. W. Ogden and Robert P. Bennett.

During the setting operation, index-bearing member 75 is maintained in engagement with the scale surfaces by its own resilience to reduce parallax error and the readings are made through the window 85 in the cover 12.

A very important feature of the invention is the location of the contacts within the evacuated volume defined by the outer and inner bellows 46 and 48, respectively. This chamber must be hermetically sealed to provide the required pressure-deflection response in the capsule and the seal must be of a nature holding a vacuum for months, or even years. Hence the contacts are situated within a dust-free volume and there is no possibility that an otherwise operative unit might be rendered inoperative through the presence of dust on one or the other of the contact elements. They are similarly protected from the effects of humidity or corrosive atmospheres.

In some designs it may be desired to attain a measure of temperature compensation by refilling the evacuated chamber defined by the bellows to a relatively low pressure. Under such circumstances there may be apprehension concerning the ability of the contacts to control the work circuits due to the well known conductive property of gases at low pressure arising from ionization. This is not a limiting factor, however, since the potentials employed in most electrically governed parachute release circuits are appreciably less than the ionization voltages required and further because the device is, in this type of service, essentially a make device, which means that it is not called upon to interrupt the work current. This switch is not limited to low voltage types of service, however, since the chamber may be completely evacuated or filled to relatively high pressures whereby considerable operating voltages and currents may be handled.

While this pressure switch has been described in the environment of a parachute release control, it will be understood that the same principles are advantageously applicable in many other fields of endeavor and there will be obvious to those skilled in the art many modifications and variations not departing essentially from the principles of the invention.

What is claimed and desired to be secured by United States Letters Patent is:

1. In combination, a base member, an expansible walled member cooperating with said base member to define an evacuated chamber, a pair of contacts situated within said chamber engageable and disengageable in response to expansion and contraction of said chamber, first means controlling the relative spacing of said contacts, means for indicating the setting of said first means, second means for controlling the relative spacing of said contacts, and means for indicating the setting of said second means.

2. In combination, a first support member, first and second bellows hermetically secured to said first support member in nesting relationship and defining an evacuated volume in cooperation therewith, first and second contact members carried respectively by the nested ends of said first and second bellows, a second support member, a first adjusting means rotatable within said second support member to advance and withdraw one of said contacts with respect to the other of said contacts, and a second adjusting means rotatable with respect to said first adjusting means to advance and withdraw one of said contacts with respect to said first adjusting means.

3. In combination, a first support member, first and second bellows hermetically secured to said first support member in nesting relationship, a second support member, a first adjusting means rotatable within said second support member to control the relative position of said nested ends, and a second adjusting means rotatable with respect to said first adjustable means to control the position of one of said nested ends with respect to said first adjusting means.

4. In combination, a first support member, first and second bellows hermetically secured to said first support member and having relatively movable end walls, a controlled device responsive to relative movement of said end walls, a first means for adjusting the relative spacing of said end walls having a scale surface, a second means for adjusting the relative spacing of said end walls having a scale surface substantially coplanar with said first scale surface, and a resilient index bearing member in contact with and cooperating with said scale surfaces.

5. In combination, a first support member, first and second bellows hermetically secured to said first support member and having relatively movable end walls, a second support member having a threaded aperture, a first scale bearing toothed member threadedly engaging said threaded aperture, a second scale bearing internally threaded toothed member abutting said first toothed member and having its scale surface substantially coplanar with that on said first toothed member, a threaded member mating with the internal thread of said second toothed member linked with one of said end walls, a resilient member cooperating with said scales, and means for actuating said first and second toothed members.

6. In combination, a first support member, first and second bellows hermetically secured to to said first support member and having relatively movable end walls, a controlled device responsive to relative movement of said end walls, a second support member having a threaded aperture, a first worm gear having a threaded extension engaging said threaded aperture, a second worm gear abutting said first worm gear having an internally threaded aperture, a threaded member mating with the internal thread of said second worm gear linked with one of said end walls, and worms respectively engaging said worm gears.

7. In combination, a first support member, a first and second bellows hermetically secured to said first support member and having relatively movable end walls, a controlled device responsive to relative movement of said end walls, a second support member having a threaded aperture, a first worm gear having a threaded extension engaging said threaded aperture, a second worm gear abutting said first worm gear with teeth parallel to its axis of rotation and to the axis of rotation of said first worm gear and having an internally threaded coaxial aperture, a threaded member mating with the internal thread of said second worm gear linked with one of said end walls, and worms respectively engaging said worm gears.

8. In combination, a first support member, a first and second bellows hermetically secured to said first support member and having relatively movable end walls, a controlled device responsive to relative movement of said end walls, a second support member having a threaded aperture, a first rotatable toothed member having a threaded extension engaging said threaded aperture, a second rotatable toothed member abutting said first toothed member and having an inner bearing surface of relatively large diameter and an inner threaded surface of relatively small diameter, the axes of rotation of said toothed members coinciding, a threaded member mating with the inner threaded surface of said second toothed member linked with one of said end walls, and a hollow stub shaft situated with its outer surface engaging said inner bearing surface of said second toothed member and its inner surface receiving said threaded member mating with said second toothed member.

9. In a settable device, a sealed housing enclosing an adjustable device, a driven member adapted upon rotation to vary the characteristics of said adjustable device, a hollow bushing mounted in said housing in alignment with said driven member having a relatively large bore over a part of its length and a relatively small bore over another portion of its length, a driving member fitting closely within said small bore and having an enlarged end extending beyond and adjacent the small bore end of said bushing, a sealing ring between the small bore end of said bushing and said enlarged end of said driving member, a member adapted for hand operation fitted to the smaller end of said driven member, a resilient member engaging the shoulder formed by the bore reduction in said bushing and said hand operated member normally maintaining the enlarged end of said driven member out of engagement with said driven member, the clearance between said hand operated member and the large bore end of said bushing being at least equal to the separation between said driving and driven members with said enlarged end at the limit of travel toward said bushing.

10. In combination, a base member, an expansible walled member cooperating with said base member to define an evacuated chamber, a pair of contacts situated within said chamber engageable and disengageable in response to expansion and contraction of said chamber, first means controlling the relative spacing of said contacts, means for indicating the setting of said first means, and second means for controlling the relative spacing of said contacts.

11. A pressure responsive switch, comprising: in combination, a first support member, first and second bellows hermetically secured to said first support member in nesting relationship and having relatively movable end walls, said first and second bellows defining an expansible chamber, a pair of electrical contacts situated within said chamber and adapted to make and break an electrical circuit in response to movement of said end walls, first means for moving one of said end walls independently of said ambient pressure, and second means for moving one of said end walls independently of said first means and said ambient pressure.

12. A pressure responsive switch, comprising: in combination, a first support member, first and second bellows hermetically secured to said first support member in nesting relationship and having relatively movable end walls, said first and second bellows defining an expansible chamber, a pair of electrical contacts situated within said chamber and adapted to make and break an electrical circuit in response to movement of said end walls, first means for setting the spacing of said end walls independently of ambient pressure whereby said contacts will make at a predetermined altitude above ground, and second means for setting the spacing of said end walls independently of said first means and said ambient pressure whereby said switch will be compensated for variations in ground barometric pressure.

13. A pressure responsive switch comprising: in combination, an expansible chamber having a pair of end walls relatively moveable with respect to one another in response to changes in ambient pressure; a pair of electrical contacts situated within said chamber and adapted to make and break an electrical circuit in response to movement of said end walls, first means controlling the relative spacing of said end walls independently of said ambient pressure; and second means controlling the relative spacing of said end walls independently of said first means and said ambient pressure.

14. A pressure responsive switch, comprising: in combination, an expansible chamber having a pair of end walls relatively moveable with respect to one another in response to changes in ambient pressure, an electric switch situated within said chamber and adapted to open and close an electric circuit in response to movement of said end walls, first means for setting the spacing of said end walls independently of ambient pressure whereby said switch will close at a predetermined altitude above ground, and second means for setting the spacing of said end walls independently of said first means and said ambient pressure whereby said pressure responsive switch will be compensated for variations in ground barometric pressure.

DONALD F. MURPHY.

References Cited in the file of this patent

UNITED STATES PATENTS

| Number | Name | Date |
| --- | --- | --- |
| 1,265,765 | Ferris | May 14, 1918 |
| 1,784,302 | Millikan et al. | Dec. 9, 1930 |
| 1,801,736 | Greenwood | Apr. 21, 1931 |
| 1,822,408 | King | Sept. 8, 1931 |
| 1,900,985 | Giesler | Mar. 14, 1933 |
| 2,102,407 | Dann | Dec. 14, 1937 |
| 2,315,137 | Shaw | Mar. 30, 1943 |
| 2,421,149 | Hard Af Segerstad | May 27, 1947 |
| 2,456,907 | Berberich | Dec. 21, 1948 |